United States Patent
Leigh et al.

(10) Patent No.: US 9,910,228 B2
(45) Date of Patent: Mar. 6, 2018

(54) BLIND-MATING OPTICAL FERRULE ASSEMBLIES

(71) Applicant: HEWLETT PACKARD ENTERPRISE DEVELOPMENT LP, Houston, TX (US)

(72) Inventors: Kevin B. Leigh, Houston, TX (US); George D. Megason, Spring, TX (US); Joseph Allen, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/325,004

(22) PCT Filed: Oct. 31, 2014

(86) PCT No.: PCT/US2014/063294
§ 371 (c)(1),
(2) Date: Jan. 9, 2017

(87) PCT Pub. No.: WO2016/068966
PCT Pub. Date: May 6, 2016

(65) Prior Publication Data
US 2017/0199338 A1    Jul. 13, 2017

(51) Int. Cl.
*G02B 6/38* (2006.01)

(52) U.S. Cl.
CPC ......... *G02B 6/3882* (2013.01); *G02B 6/3825* (2013.01); *G02B 6/3878* (2013.01); *G02B 6/3885* (2013.01)

(58) Field of Classification Search
None
See application file for complete search history.

(56) References Cited

U.S. PATENT DOCUMENTS

| | | |
|---|---|---|
| 5,809,191 A | 9/1998 | Stevens et al. |
| 6,305,848 B1 | 10/2001 | Gregory |
| 6,799,897 B2 | 10/2004 | Sherrer |
| 7,156,560 B2 | 1/2007 | Seeley |
| 7,217,040 B2 | 5/2007 | Crews et al. |
| 8,540,435 B2 | 9/2013 | Norris et al. |
| 8,672,560 B2 | 3/2014 | Haley et al. |

(Continued)

FOREIGN PATENT DOCUMENTS

WO    WO 2014018047 A1    1/2014

OTHER PUBLICATIONS

Blind Mate Connectors, (Web Page), Jan. 24, 2014, 5 Pages, http://gicuroky33.tumblr.com/post/74382965215/blind-mate-connector.

(Continued)

*Primary Examiner* — Jerry Rahll
(74) *Attorney, Agent, or Firm* — Brooks, Cameron & Huebsch, PLLC

(57) ABSTRACT

Example implementations relate to blind-mating optical ferrule assemblies. For example, an apparatus to blind-mate optical ferrule assemblies can comprise a first optical ferrule assembly including a ferrule housing and a ferrule disposed at least in part within the ferrule housing, a semi-final alignment pin and a semi-final alignment hole disposed on the first optical ferrule assembly to align the first optical ferrule assembly with a second optical ferrule assembly, and a final alignment pin and a final alignment hole disposed on the first optical ferrule assembly to further align the first optical ferrule assembly to the second optical ferrule assembly.

14 Claims, 8 Drawing Sheets

(56) References Cited

U.S. PATENT DOCUMENTS

2002/0181882 A1    12/2002   Bibbs-Brenner et al.
2006/0067627 A1     3/2006   Crews et al.
2006/0073723 A1     4/2006   Cowgill et al.
2010/0027941 A1     2/2010   Stewart et al.
2013/0121645 A1     5/2013   Haley et al.

OTHER PUBLICATIONS

International Search Report and Written Opinion: PCT/US2014/063294; dated Jul. 28, 2015; 12 pages.

BLIND-MATING OPTICAL FERRULE ASSEMBLIES

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output; and for some applications, optical fibers may be coupled to other optical fibers and/or system components by an optical connector.

DETAILED DESCRIPTION

Figure 1:
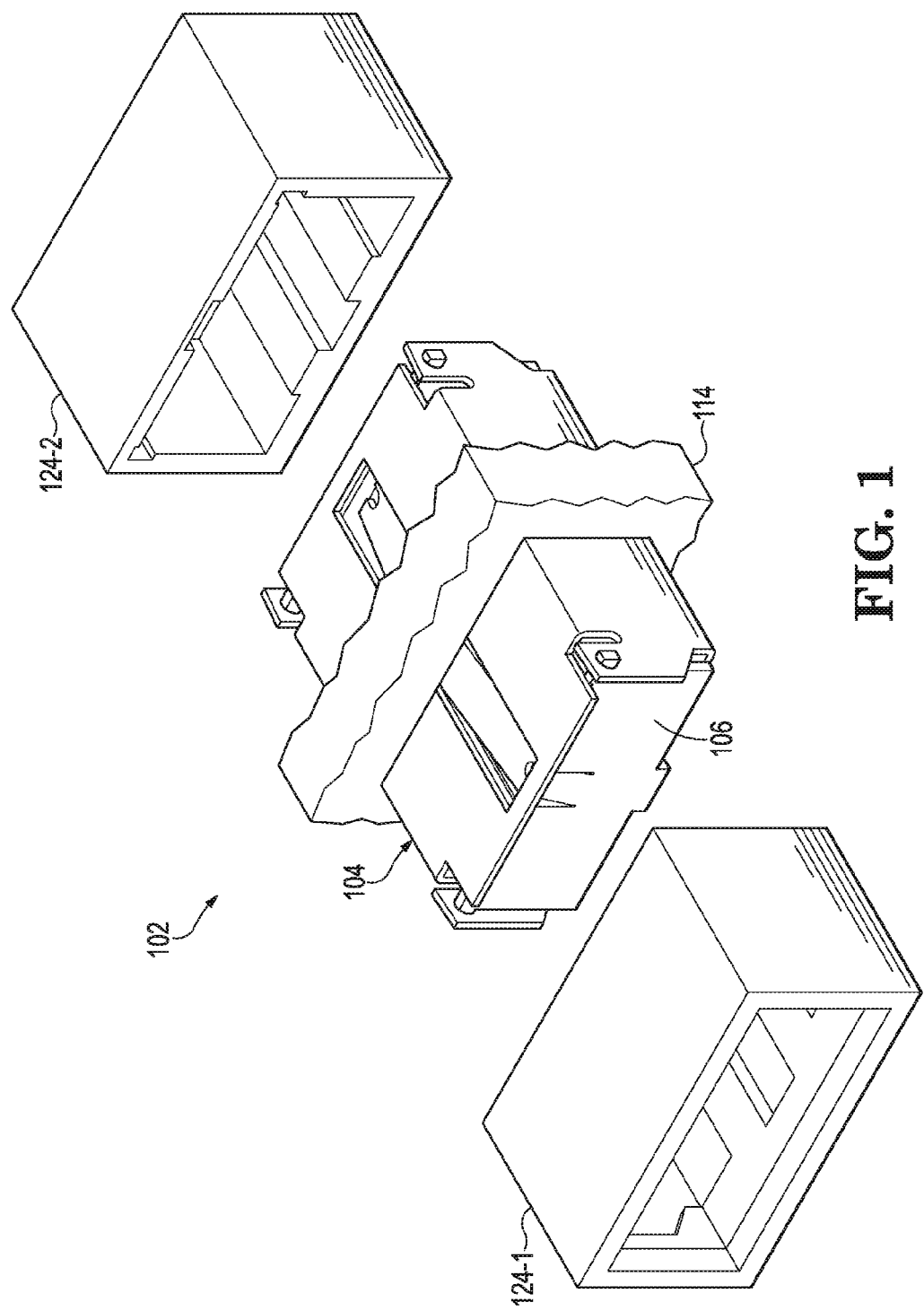
FIG. 1 illustrates an exploded view of an example optical blind-mate connector adapter, according to the present disclosure.

Optical transmission systems may be employed to interconnect network elements. Optical modules include optical fibers, which may be connected end-to-end to transfer light or optical power there between. The fibers may be terminated in connector assemblies and may be mated by an adapter. Some such optical connection systems may include blind-mate connections. As used herein, a blind-mate connection refers to a connection in which optical modules are mated without necessarily having any visual and/or tactile indications that the optical modules are properly aligned. Precision alignment (in the range of 1 um to 50 um, for example) between the optical modules can be achieved through the use of blind-mating alignment structures, so that human vision in not involved for aligning the optical modules to make the connection.

Optical modules are sometimes enclosed in an electronic module enclosure along with other components. Blade server enclosures, for example, may include a plurality of bays that house individual blade servers, optical modules, power supply modules, among other components.

In some electronic module enclosure arrangements, an optical module may be coupled to another optical module using an optical blind-mate connector adapter. Furthermore, the optical ferrules within each optical module can be blind-mated using alignment features. However, blind-mating optical ferrules often requires a greater amount of room within the electronic module enclosure, relative to systems where the optical ferrules are not blind-mated. Furthermore, blind-mating optical ferrules with alignment features often requires large alignment features to eventually blind-mate the optical ferrules with a tight tolerance. As used herein, a tolerance refers to a permissible limit of variation in the physical dimensions of the binding between the alignment features. Furthermore, a tight tolerance refers to a tolerance below a threshold level of tolerance, and a coarse tolerance refers to a tolerance at or above a threshold level of tolerance.

In contrast, blind-mating optical ferrule assemblies according to the present disclosure employs semi-final alignment features with a coarse tolerance to blind-mate optical ferrules, prior to blind-mating of the optical ferrules using final alignment features with a tight tolerance. Blind-mating optical ferrules with semi-final alignment features according to the present disclosure, makes it easier to blind-mate optical modules (or, more particularly, optical ferrules) with a tight tolerance, while reducing the risk of damaging the optical modules and/or other components of the electronic module enclosure. Similarly, blind-mating optical ferrules with semi-final alignment features according to the present disclosure can reduce the cost associated with manufacturing optical modules and optical blind-mate connector adapters.

According to the present disclosure, an optical blind-mate connector adapter can provide the first alignment with a coarse tolerance of the two optical blind-mate connectors that are inserted from the opposite ends of the optical blind-mate connector adapter. The semi-final alignment features can provide more tight tolerance than the adapter, but more coarse tolerance than the final alignment features.

FIG. 1 illustrates an exploded view of an example optical blind-mate connector adapter 102 according to the present disclosure. As illustrated in FIG. 1, an optical blind-mate connector adapter 102 can include a sleeve 104 within a sleeve housing comprising a first sleeve housing end 124-1 at a first side of a mid-plane 114 and a second sleeve housing end 124-2 at a second side of the mid plane 114. As used herein, the sleeve housing refers to the construct of the sleeve 104, installed in the mid plane 114, and with sleeve housing ends 124-1 and 124-2 installed.

As illustrated in FIG. 1, sleeve housing ends 124-1 and 124-2 can be disposed at opposite sides of mid-plane 114. In some examples, the mid-plane can be a circuit board, such as an electrical mid-plane circuit board. However, examples are not so limited, and the mid-plane 114 can include other stationary plane types, such as metal and/or plastic. Also, the sleeve housing ends 124-1 and 124-2 can be end caps of the optical blind-mate connector adapter 102. For instance, the sleeve housing ends 124-1 and 124-2 can be configured to securely fit over the respective ends of the sleeve 104.

The optical blind-mate connector adapter 102 can include a plurality of shutters 106 individually moveable between a closed position (as illustrated in FIG. 1) and an open position to allow optical ferrule assemblies to blind-mate within the optical blind-mate connector adapter 102, as described more fully herein.

Figure 2:
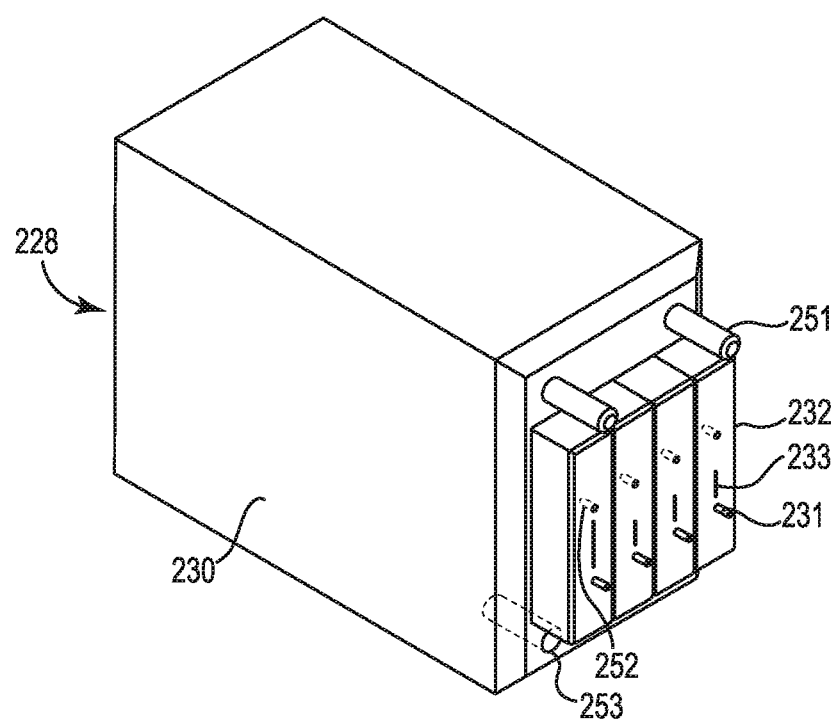
FIG. 2 illustrates an example optical blind-mate connector apparatus, according to the present disclosure.

FIG. 2 illustrates an example optical blind-mate connector apparatus, according to the present disclosure. As illustrated in FIG. 2, the optical blind-mate connector apparatus can include an optical ferrule assembly 228. In some examples, the optical ferrule assembly 228 can be slidably coupled to an actuator (not illustrated in FIG. 2).

As illustrated in FIG. 2, the optical ferrule assembly 228 can include a ferrule housing 230 and at least one optical ferrule 232 disposed at least in part in the ferrule housing 230. As used herein, an optical ferrule refers to a ring, cap, or other enclosure used to hold a plurality of optical fibers (not shown in FIG. 2). In some examples, at least one of the optical ferrules 232 may be exposed at an end of the ferrule housing 230 to allow the optical ferrule 232 to optically couple to another optical ferrule.

Figure 3:
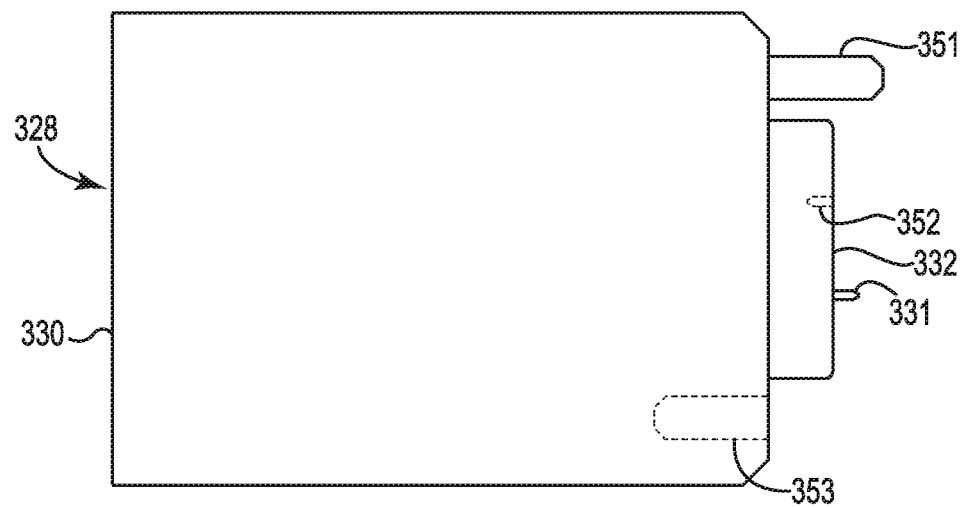
FIG. 3 illustrates a side view of an example optical blind-mate connector apparatus, according to the present disclosure.

As illustrated in FIG. 2, and discussed further in relation to FIG. 3, each optical ferrule 232 may have final alignment features for final alignment of the optical ferrule 232 to another optical ferrule (not illustrated in FIG. 2). For example, the final alignment features can be a final alignment pin 231 and a final alignment hole 252, each disposed on a surface of each optical ferrule 232. Similarly, each optical ferrule assembly 228 may have semi-final alignment features for semi-final alignment of the optical ferrule 232 to another optical ferrule (not illustrated in FIG. 2). For example, the semi-final alignment features can be a semi-final alignment pin 251 and a semi-final alignment hole 253, each disposed on a surface of the ferrule housing 230. In some examples, the ferrule (e.g., optical ferrule 232) can be independently movable with the ferrule housing 230. As used herein, independently movable refers to being movable in the x, y, and/or z axes within the ferrule housing 230.

While FIG. 2 illustrates a ferrule housing 230 having four (4) optical ferrules (e.g., optical ferrule 232), examples are not so limited. The ferrule housing may have more or fewer semi-final alignment pins 251 and semi-final alignment holes 253 than illustrated in FIG. 2. In addition, the number of semi-final alignment pins 251 and semi-final alignment holes 253 may not be the same on a ferrule housing 230. For example, FIG. 2 shows two semi-final alignment pins 251 and four ferrules 232. In other words, there does not need to be a semi-final alignment pin 251 for each of the ferrules 232. However, the semi-final alignment pins 251 and respective semi-final alignment holes 253 (in an opposing ferrule housing) need to match in number, size and shape. The semi-final alignment pins 251 may be round, oval, rectangular, square, or other shapes. If there are multiple semi-final alignment pins 251, they do not need to have the same shape or size. For example, one semi-final alignment pin 251 may be round, while another semi-final alignment pin 251 may be rectangular.

The ferrule housing 230 can include more or fewer optical ferrules than illustrated in FIG. 2. In some examples, the ferrule housing 230 can include one or more rows of optical ferrules. For example, the ferrule housing 230 can include a plurality of rows of optical ferrules, such as four (4) rows of four (4) optical ferrules, for a total of sixteen (16) optical ferrules. As illustrated in FIG. 2, each optical ferrule 232 may include optical signal elements 233. An optical signal element 233 may be a shaped and polished end of a fiber or an expanded beam lens.

FIG. 3 illustrates a side view of an example optical blind-mate connector apparatus, according to the present disclosure. Specifically, FIG. 3 illustrates a side view of an optical ferrule assembly 328. As illustrated in FIG. 3, the semi-final alignment pin 351 can be disposed on an opposite side of the optical blind-mate connector apparatus (e.g., on an opposite side of the optical ferrule assembly 328) relative to the final alignment pin 331. However, examples are not so limited, and the semi-final alignment pin 351 can be on the same side of the optical blind-mate connector apparatus (e.g., on a same side of the optical ferrule assembly 328) relative to the final alignment pin 331. Also, as illustrated in FIG. 3, the semi-final alignment pin 351 can be configured to extend further outward from the surface of optical ferrule 332 than the final alignment pin 331. By configuring the semi-final alignment pin to extend further outward from the surface of the optical ferrule 332, the semi-final alignment pin 351 can be the first structural components of the optical ferrule 332 to contact a second optical ferrule (not shown in FIG. 3) during blind-mating of optical ferrule assemblies.

In some examples, the semi-final alignment pin 351 and semi-final alignment hole 353 can be larger in diameter and/or circumference relative to the final alignment pin 331 and final alignment hole 352, respectively. Similarly, the semi-final alignment pin 351 and semi-final alignment hole 353 can be configured to be longer in length relative to the final alignment pin 331 and final alignment hole 352, respectively. By having a larger size relative to the final alignment pin and final alignment hole, the semi-final alignment pin and semi-final alignment hole can make it easier to blind-mate one optical ferrule to another, compared to blind-mating optical ferrules without the semi-final alignment pin and semi-final alignment hole. Similarly, by having a larger size relative to the final alignment pin and final alignment hole, the semi-final alignment pin and semi-final alignment hole can reduce the chances of damaging the final alignment pin 331 the final alignment hole 352, and/or other components of the optical blind-mate connector apparatus during blind-mating. Further, as discussed in relation to FIGS. 4, 5, and 6, the semi-final alignment pin 351 and semi-final alignment hole 353 can provide semi-final alignment of the optical ferrule 332 to another optical ferrule. As used herein, semi-final alignment of an optical ferrule refers to alignment of the optical ferrule to another optical ferrule with a coarse tolerance relative to final alignment features, and a tight tolerance relative to a coarse alignment feature.

While FIG. 3 illustrates the final alignment pin 331, the final alignment hole 352, the semi-final alignment pin 351 and the semi-final alignment hole 353 as tubular structures, examples are not so limited. The final alignment pins and holes, as well as the semi-final alignment pins and holes can be rectangular, box-like, oval, and/or other shapes. Regardless of shape, the final alignment hole 352 can be configured to receive a final alignment pin 331, and a semi-final alignment hole 353 can be configured to receive a semi-final alignment pin 351.

Figure 4:
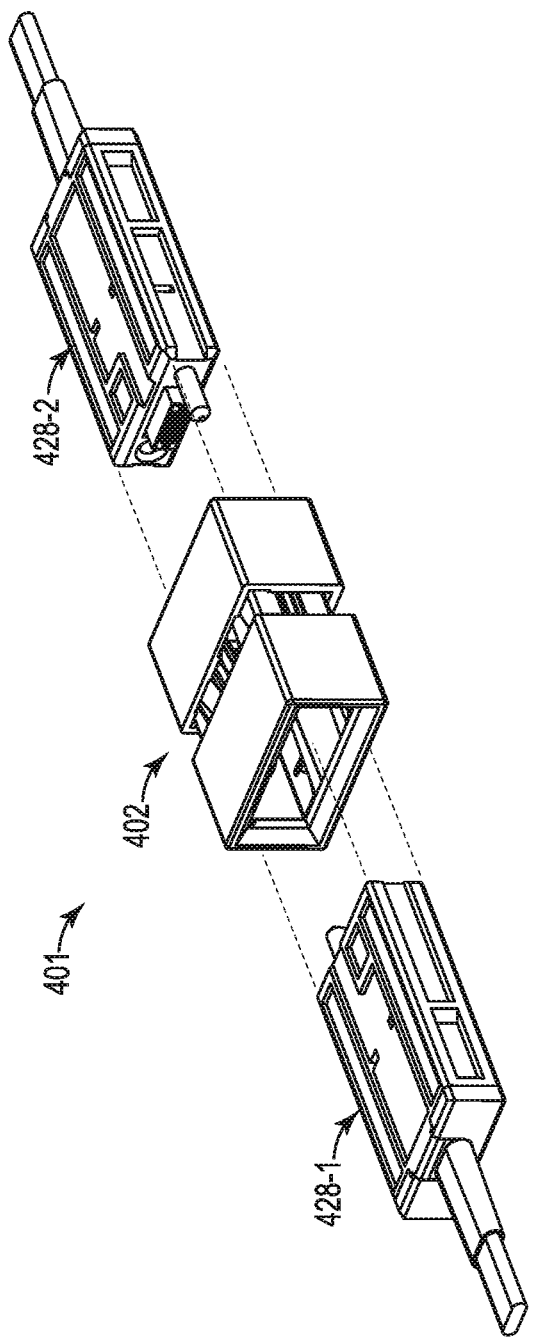
FIG. 4 illustrates an example system for blind-mating optical ferrule assemblies, according to the present disclosure.

FIG. 4 illustrates an example system 401 for blind-mating optical ferrule assemblies 428-1 and 428-2, according to the present disclosure. Specifically, FIG. 4 illustrates coarse alignment of optical ferrule assemblies 428-1 and 428-2 within an optical blind-mate connector adapter 402. For the ease of illustration, the mid-plane (e.g., mid-plane 114 illustrated in FIG. 1) is removed from the optical blind-mate connector adapter 402 in FIG. 4. The system 401 can include a first optical ferrule assembly 428-1, which may be connected to a second optical ferrule assembly 428-2 within an optical blind-mate connector adapter 402. The first optical ferrule assembly 428-1 may be blind-mated to one side of the optical blind-mate connector adapter 402, and the second optical ferrule assembly 428-2 may be blind-mated to the other side of the optical blind-mate connector adapter 402.

The system 401 can include the optical blind-mate connector adapter 402 configured to provide coarse alignment of the first optical ferrule assembly 428-1 and the second optical ferrule assembly 428-2. For example, the optical blind-mate connector adapter 402 can allow for the first optical ferrule assembly 428-1 to enter the opening of the optical blind-mate connector adapter 402 with a coarse tolerance. Similarly, the optical blind-mate connector adapter 402 can allow the second optical ferrule assembly 428-2 to enter the opening of the optical blind-mate connector adapter 402 with a coarse tolerance. In this manner, the optical blind-mate connector adapter 402 can be configured to blind-mate the first optical ferrule assembly 428-1 to the second optical ferrule assembly 428-2 with coarse tolerance (e.g., a coarse tolerance relative to the tolerance of the semi-final alignment features, as discussed in FIG. 5).

Figure 5:
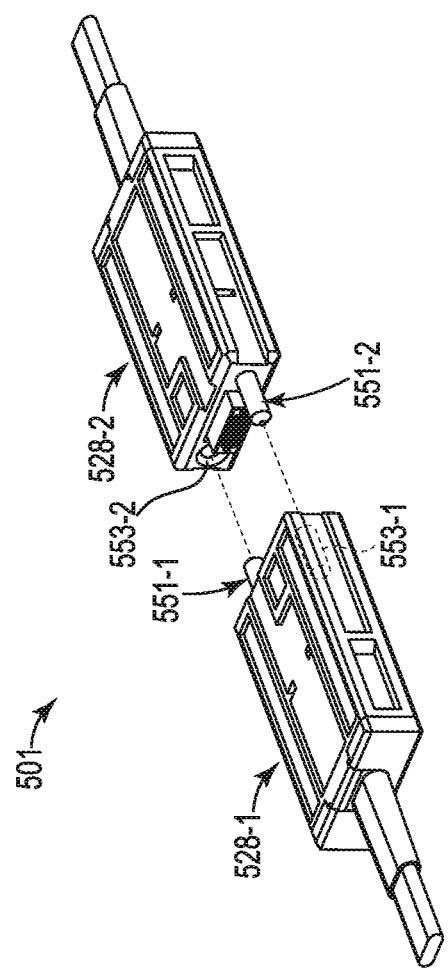
FIG. 5 illustrates an example system for blind-mating optical ferrule assemblies, according to the present disclosure.

FIG. 5 illustrates an example system 501 for blind-mating optical ferrule assemblies 528-1 and 528-2, according to the present disclosure. Specifically, FIG. 5 illustrates semi-final alignment of optical ferrule assemblies 528-1 and 528-2 within an optical blind-mate connector adapter (e.g., optical blind-mate connector adapter 402, illustrated in FIG. 4). For the ease of discussion, the optical blind-mate connector adapter is not illustrated in FIG. 5.

As illustrated in FIG. 5, each of the optical ferrule assemblies 528-1 and 528-2 can include semi-final alignment features. As used herein, a semi-final alignment feature refers to a ferrule alignment feature disposed on a first optical ferrule configured for coarse tolerance with a blind-mated second optical ferrule, relative to the tight alignment provided by final alignment features. Examples of semi-final alignment features can include a semi-final alignment pin (e.g., semi-final alignment pins 551-1 and 551-2) and a corresponding semi-final alignment hole (e.g., semi-final alignment holes 553-1 and 553-2). That is, semi-final alignment pin 551-1 and semi-final alignment hole 553-2 can align, at the same time semi-final alignment pin 551-2 and semi-final alignment hole 553-1 can align, the first optical ferrule assembly 528-1 with the second optical ferrule assembly 528-2 with coarse tolerance, relative to the alignment provided by final alignment features. However, the semi-final alignment features can also align the first optical ferrule assembly 528-1 with the second optical ferrule assembly 528-2 with a tighter tolerance relative to the alignment provided by the optical blind mate connector adapter (e.g., optical blind-mate connector adapter 402 illustrated in FIG. 4). In other words, the semi-final alignment features can provide semi-final alignment of the first optical ferrule assembly 528-1 and the second optical ferrule assembly 528-2 during blind-mating.

Figure 6:
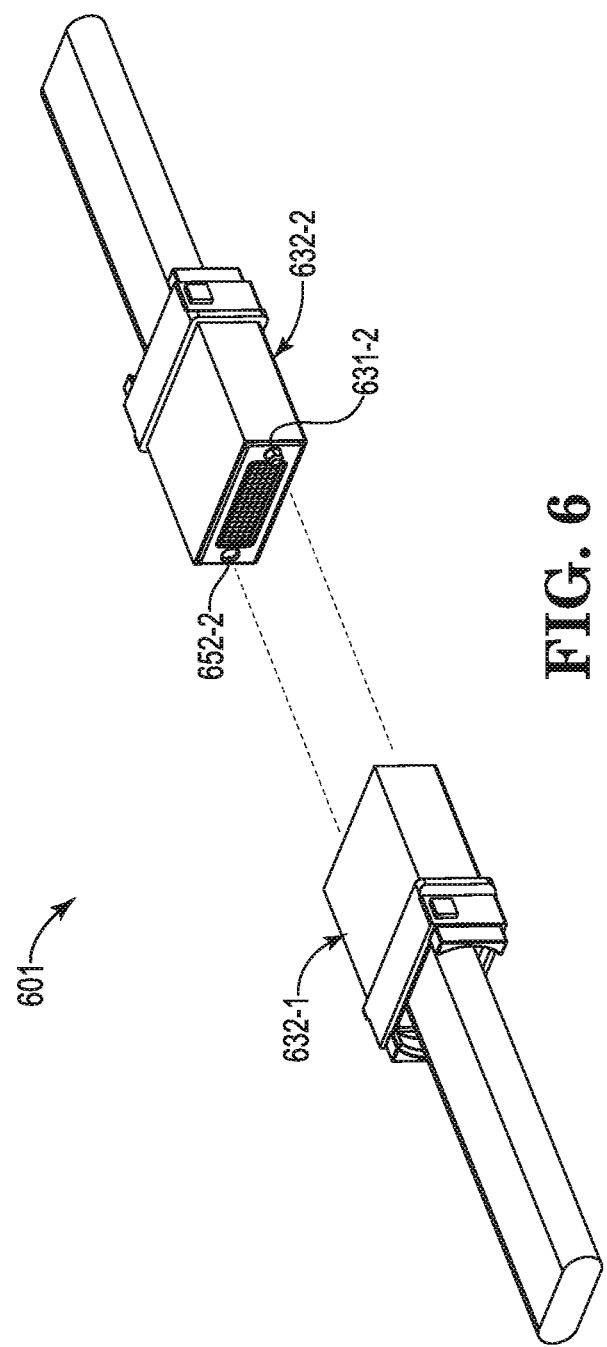
FIG. 6 illustrates an example system for blind-mating optical ferrule assemblies, according to the present disclosure.

FIG. 6 illustrates an example system 601 for blind-mating optical ferrule assemblies, according to the present disclosure. Specifically, FIG. 6 illustrates final alignment of optical ferrule assemblies (e.g., 528-1 and 528-2 illustrated in FIG. 5) within an optical blind-mate connector adapter (e.g., optical blind-mate connector adapter 402, illustrated in FIG. 4). For the ease of discussion, the optical blind-mate connector adapter and the ferrule housings are not illustrated in FIG. 6. As used herein, a final alignment feature refers to a ferrule alignment feature disposed on a first optical ferrule, configured for tight tolerance with a mated second optical ferrule, relative to the coarse alignment provided by both the optical blind-mate connector adapter and the semi-final alignment features. That is, the optical blind-mate connector adapter (e.g., 402 illustrated in FIG. 4) can provide a first level of alignment (e.g., a coarse alignment) of the optical ferrule assemblies, the semi-final alignment features can provide a second level of alignment (e.g., semi-final alignment) of the optical ferrule assemblies, and the final alignment features can provide a third level of alignment (e.g., final alignment) of the optical ferrule assemblies.

Figure 7:
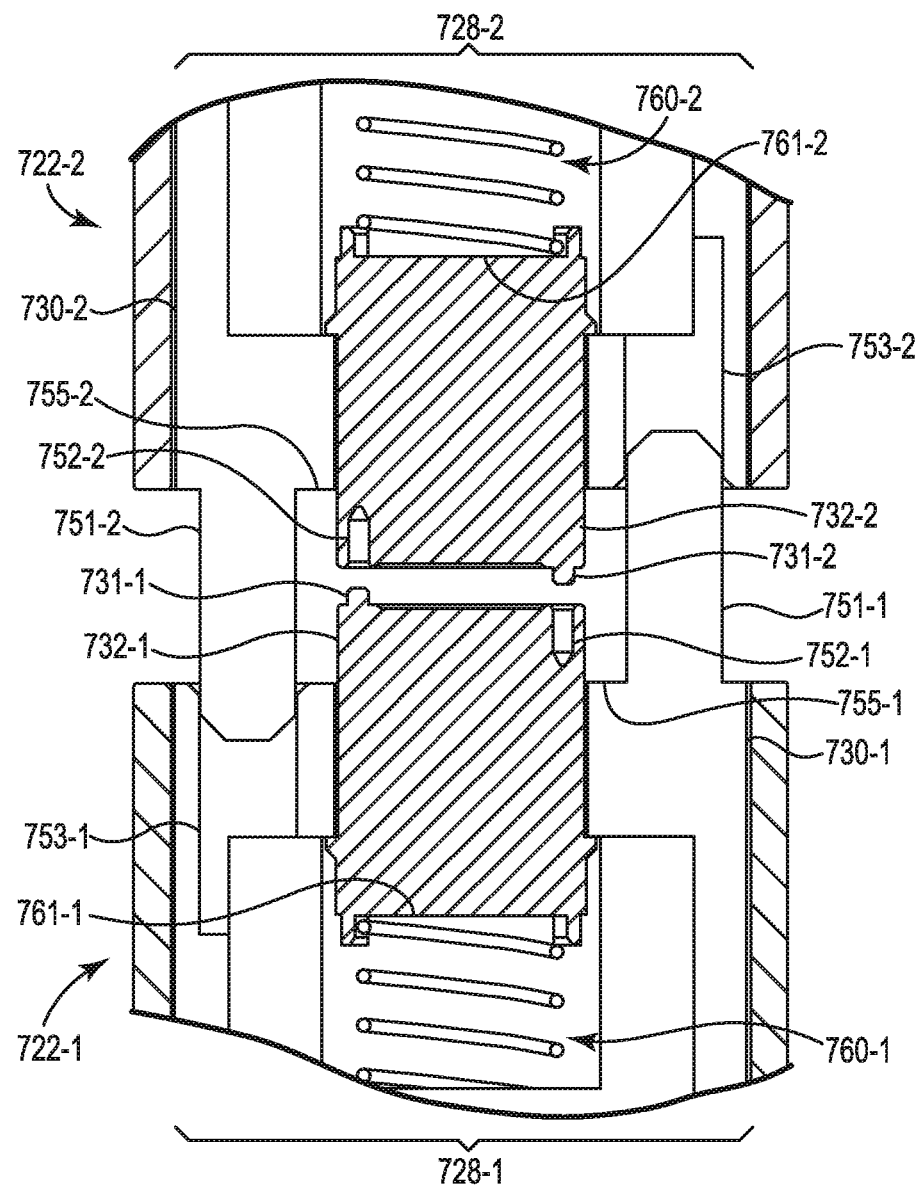
FIG. 7 illustrates a close up view of a portion of a system for blind-mating optical ferrule assemblies, according to the present disclosure.

FIG. 7 illustrates a close up view of a portion of a system 701 for blind-mating optical ferrule assemblies, according to the present disclosure. As illustrated in FIG. 7, a first optical ferrule assembly 728-1 can be blind-mated to a second optical ferrule assembly 728-2. In particular, the optical ferrule 732-1 of the first optical blind-mate connector apparatus 722-1 can be blind-mated to the optical ferrule 732-2 of the second optical blind-mate connector apparatus 722-2. As discussed previously herein, blind-mating refers to connecting one component to another without necessarily having any visual and/or tactile indications that the components are properly aligned. Precision alignment (in the range of 1 um to 50 um, for example) between the optical ferrule assemblies can be achieved through the use of blind-mating alignment structures, so that human vision in not involved for aligning the optical ferrule assemblies to make the connection.

Each optical blind-mate connector apparatus 722-1 and 722-2 can include a ferrule housing (e.g., 730-1 and 730-2, respectively), an optical ferrule assembly (e.g., 728-1 and 728-2, respectively) and at least one optical ferrule (732-1 and 732-2, respectively) disposed at least in part in the ferrule housing. Each of the optical ferrule assemblies 728-1, 728-2 can have a semi-final alignment pin (e.g., 751-1 and 751-2) and semi-final alignment hole (e.g., 753-1 and 753-2) to align one optical ferrule 732-1 with a second optical ferrule 732-2. For example, optical ferrule assembly 728-1 can have semi-final alignment pin 751-1 and semi-final alignment hole 753-1 that are configured to receive the semi-final alignment hole 753-2 and semi-final alignment pin 751-2, respectively, on optical ferrule assembly 728-2. Similarly, each of the optical ferrule assemblies 728-1, 728-2 can have a final alignment pin (e.g., 731-1 and 731-2) and a final alignment hole (e.g., 752-1 and 752-2) to further align one optical ferrule 732-1 with a second optical ferrule 732-2. For example, optical ferrule assembly 728-1 can have final alignment pin 731-1 and final alignment hole 752-1 that are configured to receive the final alignment hole 752-2 and final alignment pin 731-2, respectively, on optical ferrule assembly 728-2.

Once the semi-final alignment pins (e.g., 751-1 and 751-2) and holes (e.g., 753-1 and 753-2) are blind-mated as shown in FIG. 7, and as optical ferrule assembly 728-1 and optical ferrule assembly 728-2 continue to travel towards each other, optical ferrule 732-1 and optical ferrule 732-2 can be brought together with tight tolerance for the optical ferrules' final alignment features (e.g., 731-1 and 752-1 of optical ferrule 732-1, 731-2 and 752-2 of optical ferrule 732-2) to eventually blind-mate independent of the movement between the optical blind-mate connector apparatus and the optical blind-mate connector adapter.

Also, as illustrated in FIG. 7, the semi-final alignment features and the final alignment features can be disposed on different surfaces of the optical ferrule assemblies 728-1 and 728-2. For example, the final alignment features can include a final alignment pin (e.g., 731-1 and 731-2), as well as a final alignment hole (e.g., 752-1 and 752-2), both of which can be disposed on a surface of each optical ferrule (e.g., 732-1 and 732-2, respectively). Similarly, the semi-final alignment features can include a semi-final alignment pin (e.g., 751-1 and 751-2) and a semi-final alignment hole (e.g., 753-1 and 753-2), both of which can be disposed on a base (e.g., 755-1 and 755-2) of the ferrule housing of each optical ferrule assembly (e.g., ferrule housing 730-1 and ferrule housing 730-2, respectively). While the final alignment features are described herein as referring to a final alignment pin and a final alignment hole, examples are not so limited, and the final alignment features can include other structural components that allow for a tight tolerance between the optical ferrule assemblies 728-1 and 728-2. Similarly, while the semi-final alignment features are described herein as referring to a semi-final alignment pin and a semi-final alignment hole, examples are not so limited, and the semi-final alignment features can include other structural components that allow for a coarse tolerance relative to the final alignment features, as well as a tight tolerance relative to the optical blind-mate connector adapter.

As described herein, an optical blind-mate connector adapter, semi-final alignment features, and final alignment features, can blind-mate optical ferrule assemblies with varying tolerances. For example, the optical blind-mate connector adapter (e.g., 102 illustrated in FIG. 1) can blind-mate the first optical ferrule assembly 728-1 to the second optical ferrule assembly 728-2 with a tolerance greater than a first threshold tolerance. The semi-final alignment pins (e.g., 751-1 and 751-2) and semi-final alignment holes (e.g., 753-1 and 753-2) can blind-mate the first optical ferrule assembly 728-1 to the second optical ferrule assembly 728-2 with a tolerance less than the first threshold tolerance but greater than a second threshold tolerance, where the second threshold tolerance is less than the first threshold tolerance. Finally, the final alignment pins (e.g., 731-1 and 731-2) and final alignment holes (e.g., 751-1 and 752-2) can blind-mate the first optical ferrule assembly 728-1 to the second optical ferrule assembly 728-2 with a tolerance less than the second threshold tolerance.

In some examples, a positive mating force may be provided between opposing blind-mated ferrule assemblies 728-1 and 728-2 to ensure adequate optical coupling between the optical ferrules 732-1 and 732-2. Positive mating force for the assemblies 728-1 and 728-2 can be provided by the system modules that house 728-1 and 728-2, respectively. As used herein, a positive mating force refers to a force applied by one optical ferrule assembly against another optical ferrule assembly that allows the two optical ferrules to maintain positive mating. As used herein, positive mating of optical ferrules refers to maintaining proper alignment of two optical ferrules for transmission of light or optical power. The positive mating force can be achieved by using springs 760-1 and 760-2, disposed in each ferrule housing 730-1 and 730-2, respectively. The springs 760-1 and 760-2 can be supported by a base 761-1 and 761-2 of each ferrule 732-1 and 732-2, respectively. Also, the positive mating force applied by one optical ferrule assembly (e.g., 728-1) against the other optical ferrule assembly (e.g., 728-2) can align the first optical ferrule assembly with the second optical ferrule assembly, such that the first optical ferrule (e.g., 732-1) positively mates with the second optical ferrule (e.g., 732-2).

Figure 8:
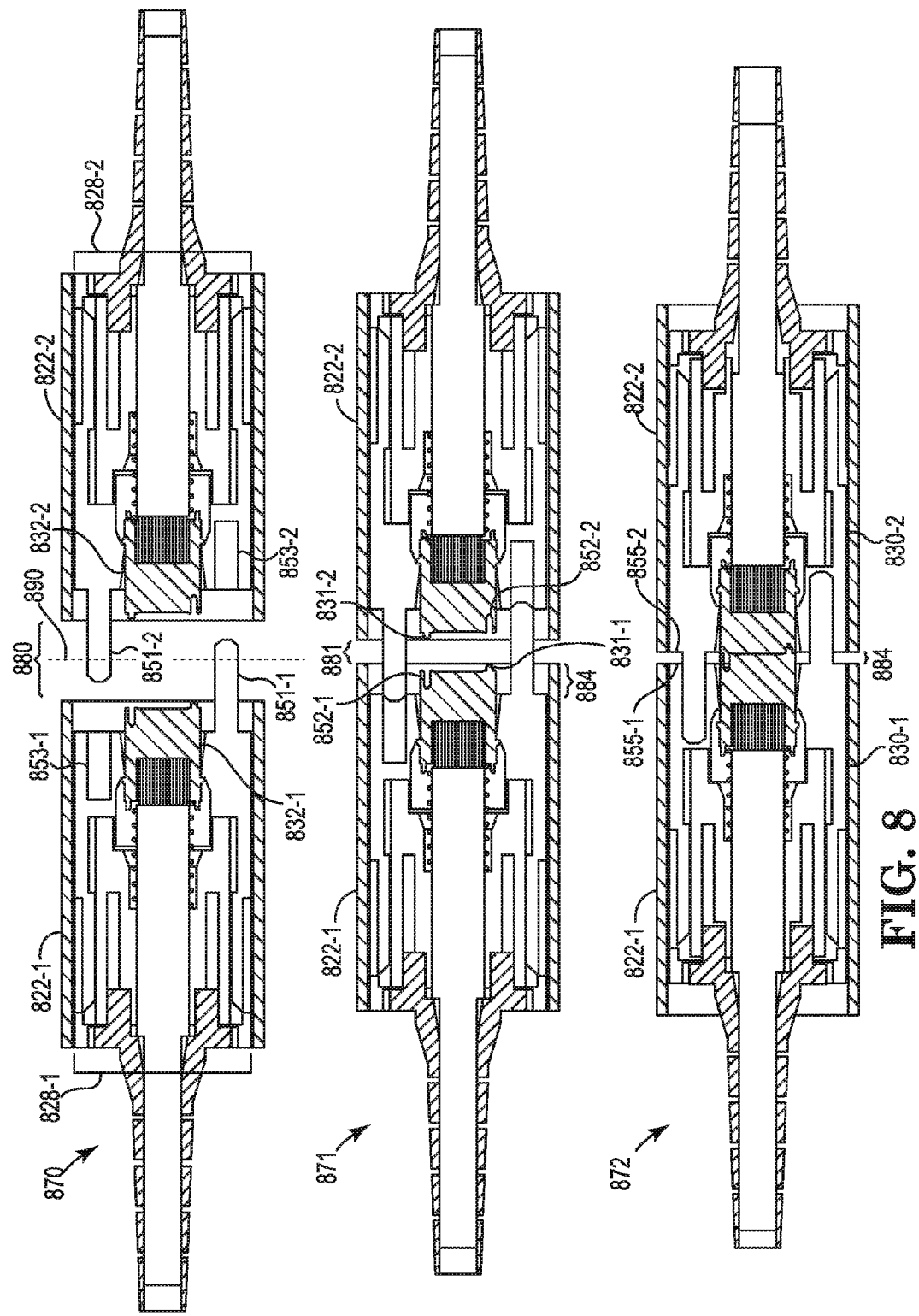
FIG. 8 illustrates a sequence of movements between a first optical blind-mate connector apparatus and a second optical blind-mate connector apparatus during blind-mating; according to the present disclosure.

FIG. 8 illustrates a sequence of movements between a first optical blind-mate connector apparatus 822-1 and a second optical blind-mate connector apparatus 822-2 during blind-mating, according to the present disclosure. For the ease of illustration, the optical blind-mate connector adapter (e.g., optical blind-mate connector adapter 102 illustrated in FIG. 1) is removed in FIG. 11.

At 870, a first optical blind-mate connector apparatus 822-1 can approach a second optical blind-mate connector apparatus 822-2. Before the first optical blind-mate connector apparatus 822-1 is blind-mated with the second blind-mate optical connector apparatus 822-2, a gap 880 may exist between the two. While the gap 880 illustrated in FIG. 8 appears to be an open space, the optical blind-mate connector apparatus 822-1 and 822-2 are connecting within the optical blind-mate connector adapter (e.g., optical blind-mate connector adapter 102 illustrated in FIG. 1).

At 871, as the first optical blind-mate connector apparatus 822-1 and the second optical blind-mate connector apparatus 822-2 move towards one another, gap 880 may narrow to gap 881. That is, the two optical blind mate connector apparatuses are closer in proximity to one another. Also, at 871, the semi-final alignment pins 851-1 and 851-2 can mate with the semi-final alignment holes 853-2 and 853-1, respectively, on the corresponding optical blind-mate connector apparatus (as discussed further herein). At 872, the first optical blind-mate connector apparatus 822-1 and the second optical blind-mate connector apparatus 822-2 move towards one another, farther to a closer gap 884, at which point the optical ferrules 832-1 and 832-2 are blind-mated and then positively mated. In some examples, the optical ferrule 832-1 of the first optical ferrule assembly 828-1 may extend beyond a center line 890 of the optical blind-mate connector adapter after the optical ferrules 832-1 and 832-2 are positively mated. When an already positively mated optical ferrule assembly (e.g., the second optical ferrule assembly 828-2) is inserted farther into the optical blind-mate connector adapter, the optical ferrule 832-1 and 832-2 of the first and the second optical ferrule assemblies 828-1 and 828-2 may be compressed back into their respective ferrule housings 830-1 and 830-2 (e.g., by compression of the springs 760-1 and 760-2 illustrated in FIG. 7), and the first optical ferrule assembly 828-1 may be pushed back away from the center line 890 by the opposing force applied by the second optical ferrule assembly 828-2. In this example, a positive mating force may be provided between opposing positively-mated ferrules to ensure adequate optical signal coupling between the optical ferrule assemblies 828-1 and 828-2. Also, in this example, the semi-final alignment features can be configured to align the positive mating force applied by the opposing blind-mated ferrules. For instance, the semi-final alignment pins 851-1 and 851-2, and semi-final alignment holes 853-2 and 853-1 can maintain the alignment between the first optical ferrule assembly and the second optical ferrule assembly, such that the blind-mated ferrule assemblies apply a positive mating force against one another.

In some examples, a semi-final alignment base (e.g., 855-1 and 855-2) can move relative to optical ferrule 832-1 and optical ferrule 832-2. For instance, prior to blind-mating, the semi-final alignment base 855-1 of optical blind-mate connector apparatus 822-1 can be recessed a distance 884 from a surface of the optical ferrule assembly. As illustrated at 872, the recessed distance can reduce to zero (0), in response to blind-mating of the first optical blind-mate connector apparatus 822-1 and the second optical blind-mate connector apparatus 822-2. Recessing optical ferrules within their respective optical blind-mate connectors can provide some level of mechanical protection of the optical ferrules 832-1 and 832-2. In some examples, the semi-final alignment base can apply a stopping force against a semi-final alignment pin. For example, semi-final alignment hole 853-2 can be configured to apply a stopping force against semi-final alignment pin 851-1, in response to insertion of the semi-final alignment pin 851-1 into semi-final alignment hole 853-2.

The movement of the semi-final alignment base (e.g., 855-1 and 855-2), which has an integral semi-final alignment pin and hole, to bring the optical ferrules together can allow optical blind-mate connector apparatus 822-1 and optical blind-mate connector apparatus 822-2 to mate with a more coarse tolerance within the optical blind-mate connector adapter. For example, the final alignment pin diameter may be 0.5 mm where very tight (e.g., about 50 um)

tolerance is needed. In contrast, the semi-final alignment pin diameter may be 2 mm where coarse (e.g., about 2 mm) tolerance is needed. The coarse tolerance of the semi-final alignment features can enable adequate tight tolerances for the optical ferrules 832-1 and 832-2 to eventually blind-mate, while enabling easier blind-mating and lower connector implementation costs.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. An optical blind-mate connector apparatus, comprising:
   a first optical ferrule assembly including a ferrule housing and a ferrule disposed at least in part within the ferrule housing;
   a semi-final alignment pin and a semi-final alignment hole disposed on the first optical ferrule assembly to align the first optical ferrule assembly with a second optical ferrule assembly;
   a semi-final alignment base recessed from a surface of the optical ferrule assembly by a distance; and
   a final alignment pin and a final alignment hole disposed on the first optical ferrule assembly to further align the first optical ferrule assembly to the second optical ferrule assembly.

2. The apparatus of claim 1, wherein:
   the semi-final alignment pin and the semi-final alignment hole are disposed on a base of the ferrule housing; and
   the final alignment pin and the final alignment hole are disposed on a surface of the ferrule.

3. The apparatus of claim 1, wherein the semi-final alignment pin is on an opposite side of the apparatus relative to the final alignment pin.

4. The apparatus of claim 1, wherein the semi-final alignment pin extends further outward from a surface of the first optical ferrule assembly than the final alignment pin.

5. The apparatus of claim 1, wherein the semi-final alignment pin and semi-final alignment hole are tubular in shape.

6. The apparatus of claim 1, wherein the ferrule is independently movable within the ferrule housing.

7. A system for blind-mating optical ferrule assemblies, the system comprising:
   an optical blind-mate connector adapter to blind-mate a first optical ferrule assembly to a second optical ferrule assembly with coarse tolerance;
   a plurality of semi-final alignment features disposed on each of the first optical ferrule assembly and the second optical ferrule assembly to blind-mate the first optical ferrule assembly and the second optical ferrule assembly with a tighter tolerance relative to the sleeve housing;
   a semi-final alignment base recessed from a surface of the optical ferrule assembly by a distance; and
   a plurality of final alignment features disposed on each of the first optical ferrule assembly and the second optical ferrule assembly to blind-mate the first optical ferrule assembly to the second optical ferrule assembly with a tighter tolerance relative to the semi-final alignment features.

8. The system of claim 7, wherein the final alignment feature is a final alignment pin or a final alignment hole and the semi-final alignment feature is a semi-final alignment pin or a semi-final alignment hole.

9. The system of claim 7, wherein the distance by which the semi-final alignment base is recessed decreases in response to blind-mating of the first and second optical ferrule assemblies.

10. The system of claim 7, wherein each of the semi-final alignment features has a coarse tolerance relative to the final alignment features.

11. A system for blind-mating optical ferrule assemblies, the system comprising:
    an optical blind-mate connector apparatus including an opening to provide coarse alignment of a first optical ferrule assembly and a second optical ferrule assembly;
    a first optical ferrule assembly to blind-mate with a second optical ferrule assembly within the optical blind-mate connector apparatus, the first and the second optical ferrule assemblies each having a plurality of semi-final alignment features and a plurality of final alignment features for blind-mating the first and the second optical ferrule assemblies; and
    a semi-final alignment base recessed from a surface of the first optical ferrule assembly by a distance.

12. The system of claim 11, the semi-final alignment features to align a positive mating force applied by the first optical ferrule assembly against the second optical ferrule assembly such that a first optical ferrule on the first optical ferrule assembly positively mates with a second optical ferrule on the second optical ferrule assembly.

13. The system of claim 11, wherein the optical blind-mate connector adapter is mounted on a mid-plane.

14. The system of claim 11, wherein the plurality of final alignment features includes a final alignment pin and a final alignment hole and the plurality of semi-final alignment features includes a semi-final alignment pin and a semi-final alignment hole.

* * * * *